United States Patent Office 2,770,708
Patented Nov. 13, 1956

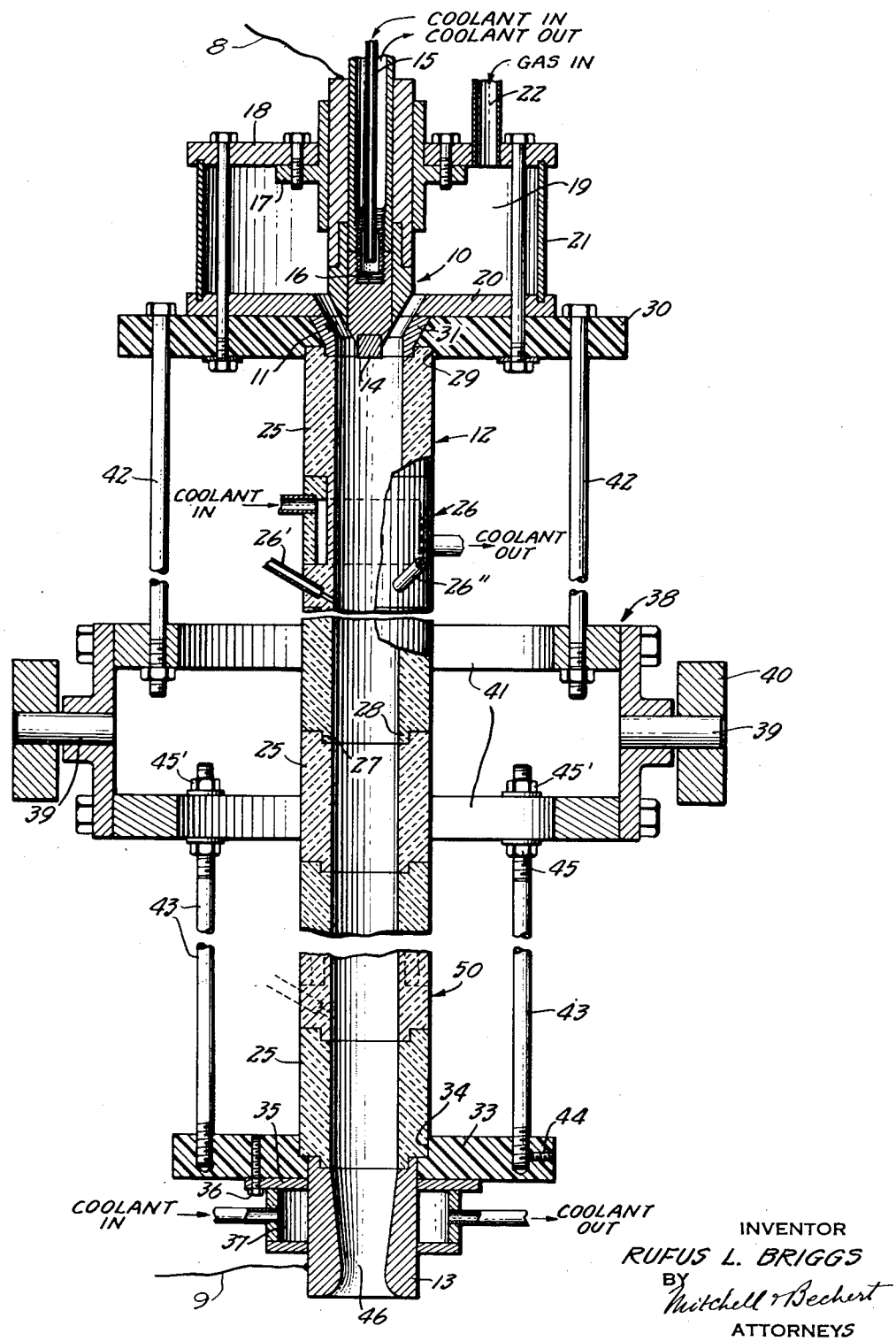

2,770,708

ELECTRIC ARC TORCH

Rufus L. Briggs, Melrose, Mass., assignor to Amalgamated Growth Industries, Inc., New York, N. Y., a corporation of Delaware Application September 21, 1954, Serial No. 457,343

12 Claims. (Cl. 219—75)

My invention relates to an electric-arc torch construction and incorporates structural refinements over the configuration disclosed in copending patent application, Serial No. 482,513, filed January 18, 1955, in the name of Dr. Alexander Rava.

It has been known that the electric-arc torch may be employed for the high-temperature heating of powdered material injected into the arc stream. Previous disclosures have shown such injection at the base of the arc, and others have shown the injection near the downstream limit of the arc stream, but these disclosures have failed to take into account the fact that two different powdered materials, which are to be processed by passing them through the arc, will not necessarily require the same amount of heating for the desired process.

Furthermore, it is known that, under stable operating conditions, the heating effect of the arc stream is dependent upon the length of time the material remains in the arc stream. If then, the two different powdered materials are inserted at the same point in the arc stream, it is only possible to vary the amount of time given materials are in the arc stream by varying the gas velocity through the arc chamber. However, in most applications, it is necessary that the gas velocity be kept within certain relatively close limits, because this velocity is required either to give the heated material a specific velocity for purposes of penetration or to project the arc to a desired extent beyond the nozzle or downstream electrode.

Variation of the current in the arc does not change the current density in the arc path itself, but does change the arc density in the arc chamber. With increasing current, the size or total effective section of the arc increases, and this results in a lowering of electrical resistance in the arc. An individual particle of material will not, therefore, become considerably hotter when passing through an arc stream of high density than through one of lower density. Low arc-stream densities will properly heat small quantities of material per unit time, and high arc-stream densities are requiried for large quantities of material. It follows, therefore, that adjustments of gas velocity or of arc current do not provide ideal methods of obtaining proper heating of different materials injected into the arc stream at the same location.

It is, accordingly an object of my invention to provide an improved electric-arc torch construction.

It is another object to provide an electric-arc torch construction in which powdered material may be selectively injected at essentially any desired location along the arc stream.

It is also an object to provide a torch construction lending itself particularly to selective elongation of the arc chamber in accordance with the individual heat-treating needs.

Specifically, it is an object to meet the above objects with a construction which will permit insertion of powdered material into the arc stream at a location and in a manner enabling it to receive the most favorable processing under proper operating conditions of gas velocity and arc density.

Other objects and various further features of novelty and invention will be pointed out or will occur to those skilled in the art from a reading of the following specification in conjunction with the accompanying drawing. Said drawing is a longitudinal sectional view of an electric-arc torch incorporating features of a preferred form of the invention, Briefly stated, I achieve selective control of the length of the arc chamber and, if desired, of the location of powder injection by employing an arc-chamber construction comprising a multiplicity of interfitting sections, which may be identical, and any adjacent two of which may be separated to allow for the insertion of another similar section or for the insertion of a special powdered-material injection unit. By the use of the term "identical sections" I wish to describe the physical feature of their design, which permits them to be joined with each other or with a powder-inserting unit to form a suitable arc chamber, but, of course, these sections may be of various lengths as long as the ends are properly interfitting so as to permit universality of assembly.

Referring to the drawing, my invention is shown in application to an electric-arc torch excited by application of potentials between leads 8—9 connected to upstream and downstream electrodes 10—13. The upstream electrode 10 is positioned centrally within the inlet 11 to an elongated arc chamber 12. The arc chamber is preferably of insulating material, such as a ceramic, and the downstream electrode 13 may be formed with or attached to the downstream end of the chamber 12. The upstream electrode 10 may comprise an elongated body converging at one end to a striking surface 14, which I have shown as formed of separate material, such as tungsten, inserted at the electrode tip. The body of electrode 10 may be bored at 16 to a depth approaching the striking surface and open at the other end for admission of coolant. For this purpose, I have shown a supply tube 15 for admitting coolant directly to the base of the bore 16 and radially spaced in said bore to allow for run-off of warmed coolant in the innular space between tube 15 and bore 16.

In the form shown, the body of electrode 10 is rigidly supported by flange means 17 secured to the top plate 18 of a glass-supply chamber 19. For convenience of assembly, I have shown the gas-supply chamber 19 as of unitary construction, comprising the plate 18 and a lower plate 20 spaced by a paripheral wall 21. An inlet 22 may be provided in the upper plate 18, and a bore in the lower plate 20 may cooperate with the electrode 10 to define part of the inlet opening 11 to the arc chamber 12. I prefer that this inlet 11 shall be annular and that it shall converge in the direction of flow, by forming both walls of the passage 11 as truncated conical surfaces. The described gas-supply chamber 19 may be merely an enlarged chamber, as shown, or it may be specially contoured internally and provided with swirl-promoting conduits, as disclosed in greater detail in my copending application, Serial No. 457,403, filed September 21, 1954.

In accordance with the invention, I provide selective control over the length of the arc-discharge path and, if desired, over the point of injection of a powder to be heat-treated or sprayed. Such control is achieved by forming the arc chamber 12 as an assembly of interfitting or "identical" sections. These sections may be of varying length, but in the form shown only two general types of sections are provided, the others being merely duplicates of one or both of these basic forms. The two types of sections may be generalized as a conduit section, as at 25, and an injection section, as shown in detail at 26. Both types of sections may be bored to the same internal diameter and each section may be counterbored, as at 27, to receive a reduced insertion end 28 of the adjacent chamber section. The fit upon insertion is preferably sufficient to prevent radially outward blow-out or leakage, and at the same time adequate to permit relatively easy manual removal and insertion of sections as needed. The assembly of sections may be completed by nesting the upstream end of the chain or succession of sections 25–26 in a counterbore 29 in a top frame or mounting member 30; frame member 30 is preferably of electrical insulating material, such as reinforced plastic or ceramic. To avoid erosion at the inlet 11, I prefer to line the frame member 30, as at 31, with a funnel-shaped section closely fitting the adjacent arc-chamber section 25.

A second mounting member 33 may be counterbored at 34 to receive the lower end of the arc chamber 12, and the assembly is maintained by longitudinally clamping the frame members 30–33 together. The downstream or lower frame assembly may be demountably carried at downstream electrode 13, as by forming the said electrode 13 unitarily with a mounting flange 35 bolted to plate 33 at 36. The flange 35 and part of the body of electrode 13 may form part of circumferentially extending coolant-circulating means having inlets and outlets as labelled in the drawing.

The securing means employed to tie the two end-frame members 30–33 together may comprise merely tie bolts extending the full distance between these plates, but I find it more convenient to employ an intermediate frame structure 38 which may serve for mounting, as on pins 39, to part of a gimbal-suspension system 40, thereby facilitating flexible manipulation of the arc in operation. This intermediate frame structure is preferably characterized by a substantial central opening or openings 41, permitting maximum manual access to the arc-chamber body 12 and yet providing securing points axially aligned with corresponding securing locations on frame members 30–33, so as to permit employment of connecting means or tie bolts 42–43. The tie bolts 43 are preferably permanently anchored in plate 33, as by set-screw means 44.

In operation, the arc discharge will function as is characteristic of devices of the character indicated, there being a substantial swirling draft of gas admitted at the inlet 11 and serving to confine the arc centrally between the electrode surface 14 and throughout the length of the arc chamber 12. At the downstream end, convergence of nozzle 46 will locally accelerate the blast of gas and will serve to keep the arc from striking the interior of the nozzle. The arc will thus be forced to project beyond the nozzle of electrode 13 and will fall fountain-like about the periphery of the electrode 13.

For a particular desired inserted powder to be heated, it may suffice merely to inject the powder, or a gas-suspension of powder, in one or more passages of the gas-supply chamber 19, all as described in my said copending application. Alternatively, for certain applications, best heating for the powder may be achieved by injection at an intermediate location 26, as shown in the drawing. At such location, the same powder may be admitted at 26' and 26", or different powders may be admitted at these angularly separated positions. The gas blast will be characterized by a swirl, tending to carry the injected powder tangentially and to induce it into the arc-discharge path.

For certain other applications, it may no longer be needed or desirable to inject the same powder, or some other powder, at the location shown at 26 in the drawing, and it may, on the other hand, be most appropriate to inject at a lower location, as designated generally 50. To make the structural conversion necessary to accommodate this desired circumstance, all that needs to be done is to release the nuts 45' by an amount corresponding to the overlap of adjacent sections 25. This will separate the end frames and permit manual removal of one or more arc-chamber sections. They can then easily be re-assembled in desired order and the nuts 45' set to secure the new assembly; locating nuts 45 may be repositioned, as necessary, if the overall length of the arc chamber 12 is changed.

It will be seen that I have described a basically simple and flexibly adaptable torch construction, lending itself to optimal operation under a variety of specific operating conditions. The arc density, arc current, and overall length may be controlled or kept constant, and at the same time the location of powder injection may be varied. Alternatively, the location of powder injection may be kept the same, and the overall length of the arc chamber may be varied.

While I have described the invention in detail for the preferred form shown, it will be understood that modifications may be made within the scope of the invention as defined in the claims which follow.

I claim:

1. In an electric-arc torch, an upstream electrode, a hollow downstream electrode, an elongated arc chamber extending between said electrodes and axially spacing all parts of said upstream electrode from all parts of said downstream electrode, and inlet-gas-supply means at the upstream end of said chamber for inducing a flow of gas along said chamber and through said downstream electrode, said chamber comprising a plurality of like interfitting sectional elements of insulating material.

2. In an electric-arc torch, an upstream electrode, a hollow downstream electrode, an elongated arc chamber extending between said electrodes, inlet-gas supply means at the upstream end of said chamber for inducing a flow of gas along the length of said chamber and through said downstream electrode, said chamber comprising a plurality of like interfitting sectional elements of electrically non-conductive material, and means symmetrically disposed about said chamber and compressionally holding the entire assembly of said sectional elements in tight interfitting relation.

3. In an electric-arc torch, an arc chamber comprising a plurality of interfitting hollow sectional elements defining an elongated passage, said sectional elements including at the downstream end thereof an element of conductive material defining a downstream electrode, a plurality of the elements adjacent said downstream electrode being of insulating material, an upstream electrode positioned coaxially with respect to an upper sectional element of said arc chamber, and means for inducing a flow of gas along said chamber and through said downstream electrode.

4. In an electric-arc torch, an elongated arc chamber comprised of a plurality of interfitting sectional elements, each element having a bore defining a part of the arc chamber, each element also having a counterbore at one end and a reduced section at the other end of a diameter to fit said counterbore, a downstream electrode connected to the furthest downstream of said elements, an upstream electrode positioned centrally in said arc chamber at the furthest upstream of said elements, said chamber being electrically insulated from said electrodes, and means for passing a flow of gas through said chamber at least from substantially said upstream electrode to and through said downstream electrode.

5. An electric-arc torch according to claim 4, in which one of said sectional elements has a generally radially inwardly directed inlet opening for admission of material to be injected into the arc chamber independently of said gas flow during operation of said torch.

6. In an electric-arc torch, an upstream frame member having an inlet bore for admission of inlet gas, a downstream frame member having a bore for passage of an electric arc therethrough, an arc chamber spanning said frame members and having an internal passage communicating with said bores, said chamber being seated in counterbores at each of said first two bores and therefore insertably removable therefrom, an upstream electrode carried by said upstream frame member and positioned centrally in said inlet, a hollow downstream electrode carried by said downstream frame member and connected to the downstream end of said arc chamber, and readily detachable compressional securing means extending between said frame members for releasably securing said arc chamber in assembled relation with said frame members, each said securing means comprising separate elements connected to said frame members and removably connected to each other at a location intermediate said frame members, whereby different arc chambers may be readily removed and replaced so as to minimize downtime of the torch.

7. In an electric-arc torch, an upstream frame member having an inlet bore for admission of inlet gas, a downstream frame member having a bore for passage of an electric arc therethrough, an arc chamber spanning said frame members and comprising a plurality of interfitting bored elements defining a passage communicating with said first-mentioned bores, an upstream electrode positioned centrally in said inlet, a bored downstream electrode connected to the downstream end of said arc chamber, and readily detachable compressional securing means extending between said frame members for releasably securing said arc chamber in assembled relation with said frame members, said securing means including first and second tie rods extending toward each other and connected to said frame members and removably connected to each other, whereby different arc chambers may be readily removed and replaced so as to minimize downtime of the torch.

8. In an electric-arc torch, an upstream frame member having an inlet bore for admission of inlet gas, a downstream frame member having a bore for passage of an electric arc therethrough, an arc chamber spanning said frame members and comprising a plurality of interfitting bored elements defining a passage communicating with said first-mentioned bores, one of said elements having an injection opening accessible to the outside of said one element and communicating with the bore in said one element for supply of injected material into the arc stream during the operation of the torch, an upstream electrode positioned centrally in said inlet, a downstream electrode having a bore communicating with the downstream end of said arc chamber, and readily detachable compressional securing means extending between said frame members for releasably securing said arc chamber in assembled relation with said frame members, each said securing means including a first elongated member secured to one frame member and a second elongated member secured to the other frame member, and means detachably securing said elongated members to each other, whereby different arc chambers may be readily removed and replaced so as to minimize down time of the torch.

9. In an electric-arc torch, an upstream frame member having an inlet bore for admission of inlet gas, a downstream frame member having a bore for passage of an electric arc therethrough, an arc chamber spanning said frame members and having a continuous internal passage communicating with said first-mentioned bores, an upstream electrode positioned centrally in said inlet, a downstream electrode having a bore communicating with the downstream end of said passage, and readily detachable compressional securing means extending between said frame members for releasably securing said arc chamber in assembled relation with said frame members, said securing means comprising a mounting framework intermediate said spaced frame members, means connecting said framework to said respective frame members, and a readily detachable securing element in one of said connection means.

10. A torch according to claim 9, in which said central supporting framework includes gimbal-mounting means.

11. A torch according to claim 9, in which said connecting means comprises a plurality of longitudinally extending tie bolts symmetrically positioned about said chamber and separately releasably connecting said framework to said respective frame members.

12. A torch according to claim 9, in which said arc chamber comprises a plurality of interfitting hollow chamber sections, and in which coolant-circulating means and injection means independent of said inlet bore are both provided at one of said sections, said coolant-circulating means extending peripherally about and in heat-dissipating relation with said one section.

References Cited in the file of this patent

UNITED STATES PATENTS

| | | |
|---|---|---|
| 895,196 | Reid | Aug. 4, 1908 |
| 1,002,721 | Mathers | Sept. 5, 1911 |
| 2,471,531 | McIntyre et al. | May 31, 1949 |